United States Patent [19]
Dimitrova et al.

[11] Patent Number: 6,100,941
[45] Date of Patent: Aug. 8, 2000

[54] APPARATUS AND METHOD FOR LOCATING A COMMERCIAL DISPOSED WITHIN A VIDEO DATA STREAM

[75] Inventors: Nevenka Dimitrova, Yorktown Heights; Thomas Mc Gee, Garrison; Jan Hermanus Elenbaas, New York, all of N.Y.; Eugene Leyvi, Fairlawn, N.J.; Carolyn Ramsey, Ossining, N.Y.; David Berkowitz, Palo Alto, Calif.

[73] Assignee: U.S. Philips Corporation, New York, N.Y.

[21] Appl. No.: 09/123,444

[22] Filed: Jul. 28, 1998

[51] Int. Cl.$^7$ ........................................ H04N 5/14
[52] U.S. Cl. .................. 348/700; 348/722; 348/907; 386/52; 358/908
[58] Field of Search .................. 348/699, 700, 348/722, 907; 358/908; 382/107, 112; 386/52

[56] References Cited

U.S. PATENT DOCUMENTS

| | | | |
|---|---|---|---|
| 4,390,904 | 6/1983 | Johnston et al. | 358/908 |
| 5,245,436 | 9/1993 | Alattar | 348/722 |
| 5,343,251 | 8/1994 | Nafeh | 348/907 |
| 5,621,454 | 4/1997 | Ellis et al. | 348/907 |
| 5,668,917 | 9/1997 | Lewine | 358/908 |
| 5,692,093 | 11/1997 | Iggulden et al. | 358/908 |
| 5,920,360 | 7/1999 | Coleman, Jr. | 348/700 |

*Primary Examiner*—Victor R. Kostak
*Attorney, Agent, or Firm*—Edward W. Goodman

[57] ABSTRACT

A commercial detection apparatus includes a frame grab thread which acquires frames from an input data stream to be analyzed by a cut detector thread and a filter thread. A commercial detection thread determines whether a commercial has occurred from data created by the cut detector thread and the filter thread stored in a memory. A factor used by the commercial detection thread is whether a black frame has occurred. The input data stream is divided into a plurality of regions and then a maximum and minimum value for a section of these regions is determined and compared to one another. If the maximum and minimum values are close enough, and the maximum value is below a threshold, then the frame is deemed to be black. The commercial detection thread also looks at the average cut frame distance, cut rate, changes in the average cut frame distance, the absence of a logo, a commercial signature detection, brand name detection, a series of black frames preceding a high cut rate, similar frames located within a specified period of time before a frame being analyzed and character detection. During playback, the detected commercials are either skipped or substituted with alternate content.

19 Claims, 13 Drawing Sheets

EUGENE
FIG. 14
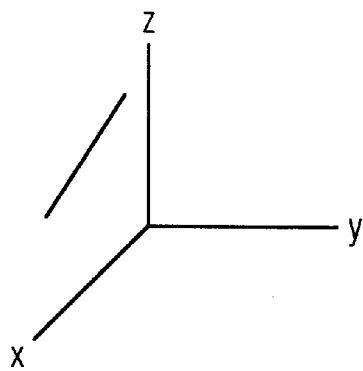
FIG. 15A
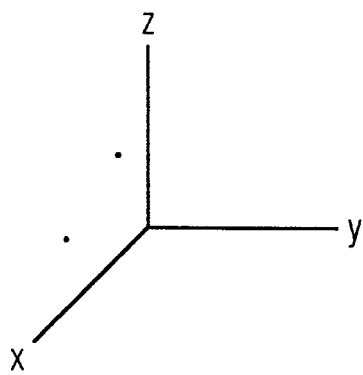
FIG. 15B
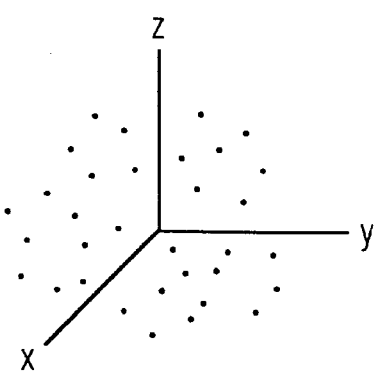
FIG. 15C

| 3 | 6 | 7 | |
|---|---|---|---|
| 3 | 6 | 3 | |
| 3 | 6 | 1 | |
| | | | |

| 3 | 6 | 8 | |
|---|---|---|---|
| 3 | 6 | 4 | |
| 3 | 6 | 7 | |
| | | | |

| 0 | 0 | 1 | |
|---|---|---|---|
| 0 | 0 | 1 | |
| 0 | 0 | 6 | |
| | | | |

FRAME LIST BUFFER

| 1 | CUT | 1.00 | POINTER 1 |
|---|---|---|---|
| 2 |  | 1.02 | POINTER 2 |
| 3 |  |  | POINTER 3 |
| 4 | BLACK | 1.06 | POINTER 4 |
| 5 |  |  | POINTER 5 |
| 6 |  |  | POINTER 6 |
| 7 |  |  | POINTER 7 |
| 8 |  |  | POINTER 8 |
| 9 |  |  | POINTER 1 |
| 10 |  |  | POINTER 2 |
| 11 |  |  |  |
| 12 |  |  |  |
| 13 |  |  |  |
| 14 |  |  |  |
| 15 |  |  |  |
| 16 |  |  |  |
| 17 |  |  |  |
| 18 |  |  |  |
| 19 |  |  |  |
| 20 |  |  |  |
| 21 |  |  |  |

APPARATUS AND METHOD FOR LOCATING A COMMERCIAL DISPOSED WITHIN A VIDEO DATA STREAM

BACKGROUND OF THE INVENTION

1. Field of the Invention

This invention relates to the field of video recording and playback systems. Specifically, this invention relates to a method and apparatus for locating a commercial within a video data stream.

Television programs are commonly recorded through the use of a Video Cassette Recorder ("VCR"). Recordation allows a user to either view a program at a later time or to simultaneously watch a program and retain a copy of it to view at a later time. When a VCR is used to create a copy of the program to be viewed at a later time, many users are not interested in the content of commercials or promotions that are interposed within the television program. Such a user generally skips through these commercials manually.

2. Description of the Related Art

A device designed to perform skipping autonomically, such as U.S. Pat. No. 5,151,788 to Blum, cues the VCR to stop recording upon the occurrence of a "black frame". A black frame is usually found immediately before and after a commercial segment. Such a device also discerns a change in "activity" of the images that are displayed on the screen. An activity is the rate of change in the luminance level between two different sets of frames. Commercials are generally filled with "activity". When a low amount of activity is detected, the commercial is deemed to have ended. A resumption in recording follows.

Unfortunately, an "activity" is not well defined and, therefore, it is difficult to determine exactly when an activity begins or ends. Any black screen will stop the VCR from recording. As long as there is subsequent "activity", the device will assume the presence of a commercial. Consequently, a black screen followed by an action sequence in a program can be misjudged and skipped as a commercial. Alternatively, a slow-paced commercial might be misjudged and recorded as a program.

Another technique for identifying a black frame such as disclosed in U.S. Pat. No. 4,314,285 by Bonner et al., senses a drop in the voltage level of the input signal below a threshold. Yet another technique, such as disclosed in U.S. Pat. No. 5,333,091 by Iggulden et al., is to record the entire program including any commercials. A notation is made whenever a black frame is broadcast. After recordation, a processor determines whether the time period in between black frames was a commercial or a program. This is accomplished by a simple formula. If the time period is less than 5 minutes, it's deemed to be a commercial. During playback, the device fast-forwards the tape past the areas determined to be commercials. Since the device must remember when to start and stop playback, a special tape must be used or a standard tape must be altered thereby increasing the system cost. Furthermore, two black frames within five minutes of each other is not necessarily representative of a commercial as this could occur during a dimly lit or dark scene.

In still another technique, such as disclosed in U.S. Pat. No. 5,668,917 to Lewine, commercials are identified based on matching images. Sequential frames which match too closely, are assumed to represent a commercial. Scenes typically found in a talk show or a sit-com, where the actors do not often move, can be misjudged as a commercial and skipped under this technique.

All of the prior art devices are deficient in that their methods for discerning whether a signal is a commercial are often inaccurate. If there is a black frame in the middle of a movie, most of these devices will mistake it for a commercial. Therefore, there is a need for a commercial detection device which can find a commercial more reliably.

OBJECTS AND SUMMARY OF THE INVENTION

In accordance with one aspect of the invention, a home information appliance for detecting a black frame occurring prior to or following a commercial within a video data stream divided into a plurality of frames comprises a black frame detector. The black frame detector performs the steps of dividing an analyzed frame of said frames into a plurality of regions; calculating an average maximum luminance value for said regions; calculating an average minimum luminance value for said regions; comparing said average maximum luminance value and said average minimum luminance value with a black frame threshold; and identifying the occurrence of a black frame based on said step of comparing.

In accordance with another aspect of the present invention, a home information appliance for detecting at least a portion of a commercial within a video data stream divided into a plurality of frames comprises at least one of an average cut frame distance detector, a cut frame distance trend detector, a brand name detector, a cut rate and black frame detector, a frame similarity detector, a character detector, and a static image detector. The average cut frame distance detector performs the steps of calculating a quotient which includes a numerator representing the number of frames between a first frame with a cut and a previous frame with a cut and a denominator representing the number of cuts between said previous and first frames; comparing said quotient to a cut frame distance threshold; and identifying the occurrence of a portion of a commercial based upon said step of comparing. The average cut frame distance trend detector determines a change in the number of cuts in a plurality of frames and detects a portion of a commercial based on said change. The brand name detector performs the steps of processing said data stream through at least one of an audio processor, a video processor, and a closed captioning processor to produce text; comparing said text to a bank of product and trade names, and identifying a portion of a commercial based upon said step of comparing. The cut rate and black frame detector identifies a portion of a commercial based on whether a series of black frames has occurred within a cut and black frame time period before an analyzed cut; the analyzed cut occurring within a sequence of cuts, the sequence occurring within a cut rate time period. The frame similarity detector determines whether a present frame is similar to a previous frame and detects a portion of a commercial when a frame within a time period is similar to the present frame. The character detector performs the steps of finding letters within an analyzed frame of said frames; creating a box around said letters; determining dimensions of said box; determining a location of said box within said analyzed frame; analyzing said dimensions and said location of said analyzed frame with subsequent analyzed frames; and detecting a portion of a commercial based upon said step of analyzing. The static image detector detects a portion of a commercial when a number of static frames has occurred within a time period.

In accordance with yet another aspect of the present invention, a system for detecting commercials within a video data stream divided into a plurality of frames comprises a frame grabber for acquiring said frames. A first detector identifies within said data stream at least one of cuts, similar frames located within a first period of time, and black frames. A second detector identifies within said data stream at least one of frames which are similar within a second period of time and frames which are substantially the same color. A third detector identifies said commercials using information produced by said first and second detectors.

In accordance with yet still another aspect of the present invention, a method is used for identifying commercials within a video data stream divided into a plurality of frames through detection of at least one of average cut frame distance, cut frame distance, brand name, black frame, cut rate and black frame, frame similarity, character detection, and static image. The average cut frame distance detection includes calculating a quotient which includes a numerator representing the number of frames between a first frame with a cut and a previous frame with a cut and a denominator representing the number of cuts between said previous and first frames; comparing said quotient to a cut frame distance threshold; and identifying the occurrence of a portion of a commercial based upon said step of comparing. The average cut frame distance trend detection is a determination of a change in the number of cuts in a plurality of frames, detection of a portion of a commercial being based on said change. The brand name detection includes the steps of processing said data stream through at least one of an audio processor, a video processor, and a closed captioning processor to produce text; comparing said text to a bank of product and trade names; and identifying a portion of a commercial based upon said step of comparing. The black frame detection includes the steps of dividing an analyzed frame of said frames into a plurality of regions; calculating an average maximum luminance value for said regions; calculating an average minimum luminance value for said regions; comparing said average maximum luminance value and said average minimum luminance value with a black frame threshold; and identifying the occurrence of a beginning or an ending of a commercial based on said step of comparing. The cut rate and black frame detection identifies a portion of a commercial based on whether a series of black frames has occurred within a cut and black frame time period before an analyzed cut; an analyzed cut occurring within a sequence of cuts, the sequence occurring within a cut rate time period. The frame similarity detection is a determination of whether a present frame is similar to a previous frame, a portion of a commercial being when a frame within a time period is similar to the present frame. The character detection includes the steps of finding letters within an analyzed frame of said frames; creating a box around said letters; determining dimensions of said box; determining a location of said box within said analyzed frame; analyzing said dimensions and said location of said analyzed frame with subsequent analyzed frames; and detecting a portion of a commercial based upon said step of analyzing. The static image detection identifies a portion of a commercial when a number of static frames has occurred within a time period.

It is therefore an object of the present invention to provide a commercial isolation apparatus and/or method with an increased detection reliability rate.

It is a further object of the present invention to provide a commercial isolation apparatus which uses a combination of advanced techniques not shown in the prior art.

It is another object of the present invention to provide an enhanced black frame detection technique.

These objects and others will become more apparent when viewed in light of the following description read in conjunction with the accompanying drawings where like reference numerals are meant to indicate the same element.

BRIEF DESCRIPTION OF THE DRAWINGS

FIG. 14 shows a group of letters analyzed by the text detection method;

FIGS. 15A, 15B and 15C show the relation of height and location of consecutive boxes of a character isolator (text detection method);

DETAILED DESCRIPTION OF THE PREFERRED EMBODIMENTS

General Overview

Figure 1A:
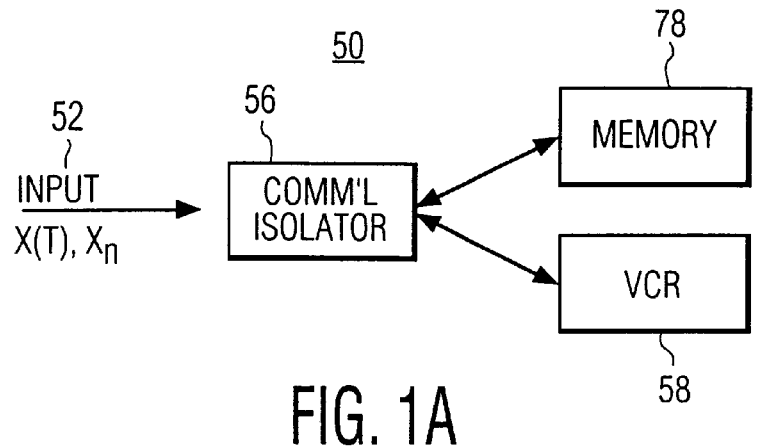
FIG. 1A is a block diagram representation of an input signal split between a VCR and a commercial isolator in accordance with a first embodiment of the present invention.
Figure 1B:
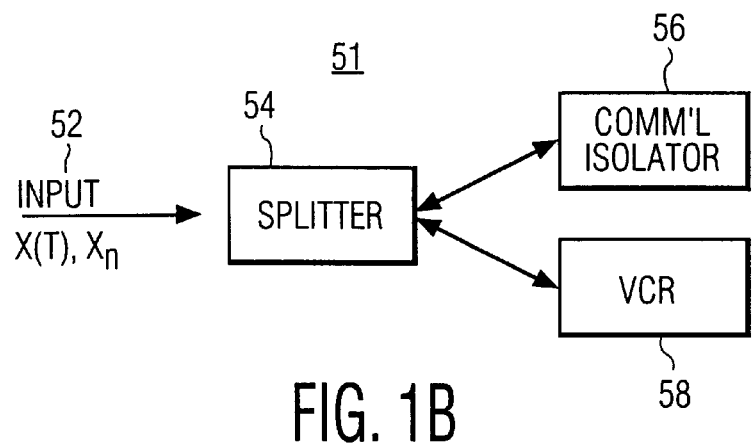
FIG. 1B is a block diagram of an input signal received by a commercial isolator and thereafter split between a VCR and a memory in accordance with an alternative embodiment of the invention.

Referring to FIG. 1A, a home information appliance 50 includes an input 52 supplied to a commercial isolator 56. A memory 78 is used by commercial isolator 56 to temporarily retain information and to ultimately store the times of detected commercials. Commercial isolator 56 supplies input 52 to a VCR 58. In accordance with an alternative embodiment, as shown in FIG. 1B, a home information appliance 51 includes an input 52 supplied through a splitter 54 to both VCR 58 and a commercial isolator 56. Appliance 51 is particularly suitable for cataloging commercials.

Figure 4A:
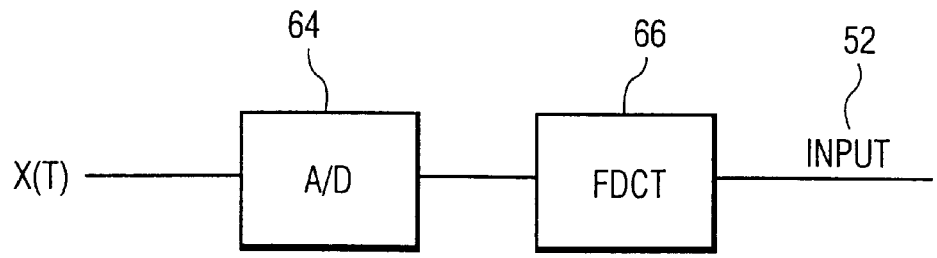
FIGS. 4A and 4B are block diagrams for transforming an analog and compressed signal into the input signal, respectively.

Referring again to FIG. 1A, input 52 can be formed from an analog (x(t)) or digital ($x_n$) format. The commercial isolation techniques use coefficients of the video signal derived from a discrete cosine transform ("DCT"). FIG. 4A is directed to providing input 52 from analog signal x(t).

Figure 4B:
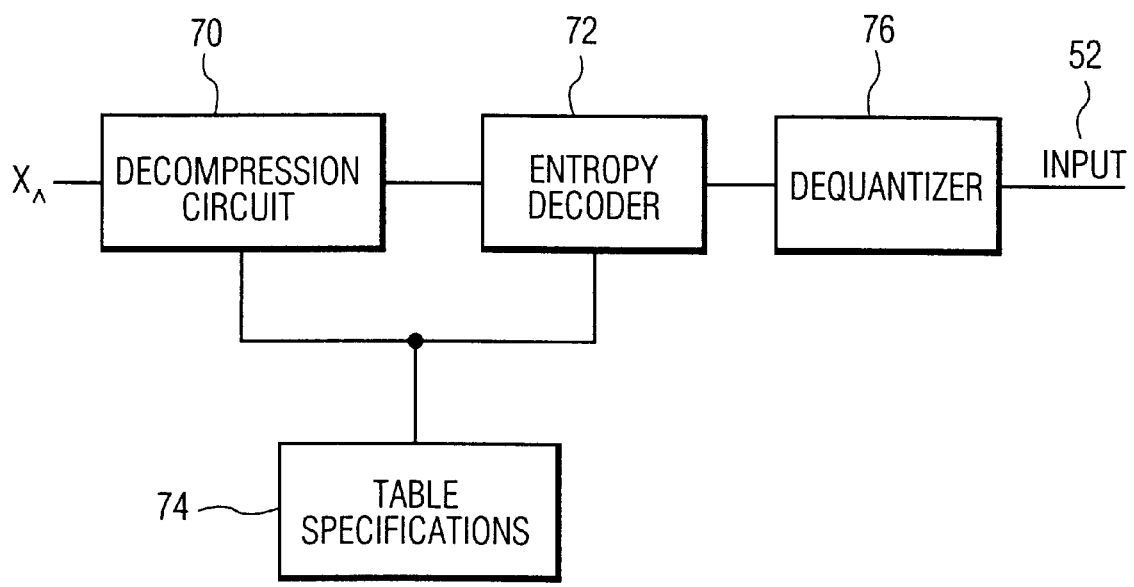

Analog signal x(t) is converted to a digital signal by an A/D converter 64 and is then supplied to a forward discrete cosine transform ("FDCT") 66 in producing input 52. Any commercially available A/D converter and FDCT can be used. FIG. 4B is directed to producing input 52 from a compressed signal Xn. Compressed signal Xn is decompressed by a decompression circuit 70, and then decoded by an entropy decoder 72. An dequantizer 76 dequantizes the decoded signal producing input 52. Entropy decoder 72 and decompression circuit 70 are controlled by a table specifications 74 which is well known in the art.

Input 52 can be any video or combination video/audio source. It could be, for example, a television signal or an Internet file broadcast. Storage could be on any medium. In the present example, a VCR tape is shown but it could apply to an optical medium, magnetic storage, or any other storage means accessible randomly, linearly, or through any other method.

Figure 2:
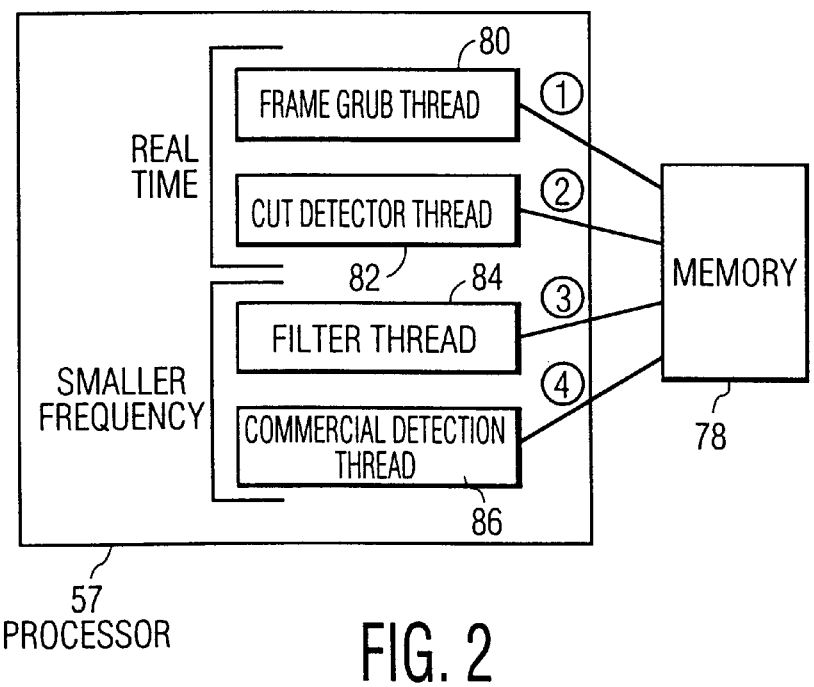
FIG. 2 is a block diagram of a processor including different threads and an associated memory.

Referring to FIG. 2, commercial isolator 56 includes a processor 57 and a memory 78. Processor 57 controls 4 distinct threads. These are a frame grab thread 80, a cut detector thread 82, a filter thread 84, and a commercial detection thread 86. All of these threads will be explained in more detail below. The platform used in the following illustrative examples is a standard VCR with a personal computer. An interface would be required to feed back data from the VCR to the computer. If no feedback is available, a tape content identification apparatus would be required. There are VCRs commercially available which have this feedback capability. Specialized products like a PHILIPS 100BK, for example, could be used. Alternatively, the invention could be implemented using stand-alone software on a personal computer.

I. Recording

Figure 3C:
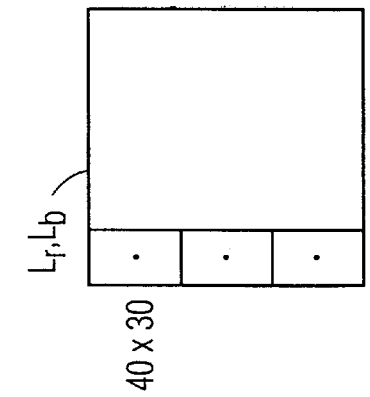
FIGS. 3A, 3B, 3C and 3D illustrate scaling and transformation of an input signal.
Figure 3D:
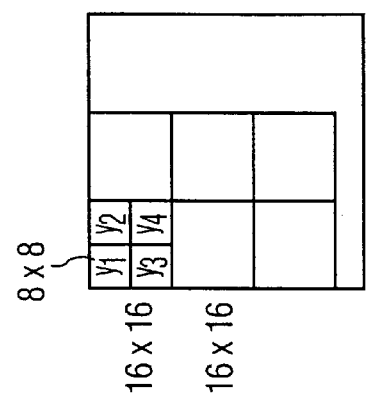
Figure 3B:
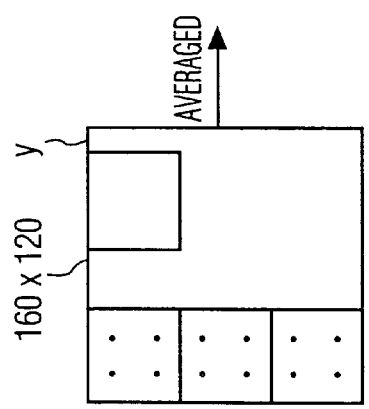
Figure 3A:
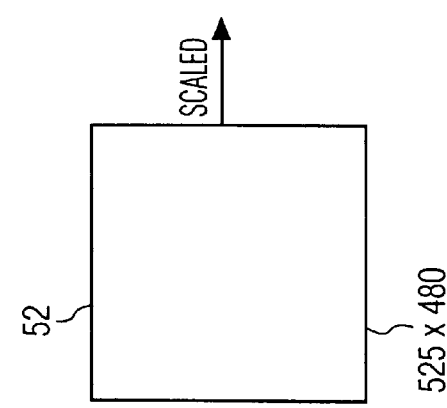

Each input frame includes 3, two-dimensional arrays. One corresponds to the luminance Y and the other two correspond to chrominance red (Cr) chrominance blue (Cb). Referring to FIG. 3A, input 52 will have the standard 525×480 coefficients (or pixels). This is then scaled down to 160×120 coefficients as shown in FIG. 3B. This represents luminance Y. For color, an additional computation is performed. A sub-block of four chrominance values is averaged to result in a 40×30 coefficient block for Cr and Cb as shown in FIG. 3c.

Referring again to FIG. 2, the above computations are performed by frame grab thread 80. Once a frame is acquired by frame grab 80, control is passed to cut detector thread 82. Cut detector thread 82 determines: 1) whether the frame is a black frame 2) whether a cut (a rapid change in the scene) has occurred and 3) whether the frame is a static frame. Control may then proceed to filter thread 84 which filters keyframes for similarity or unicolor. Finally, the commercial detection process can be performed by commercial detection thread 86.

Figure 5:
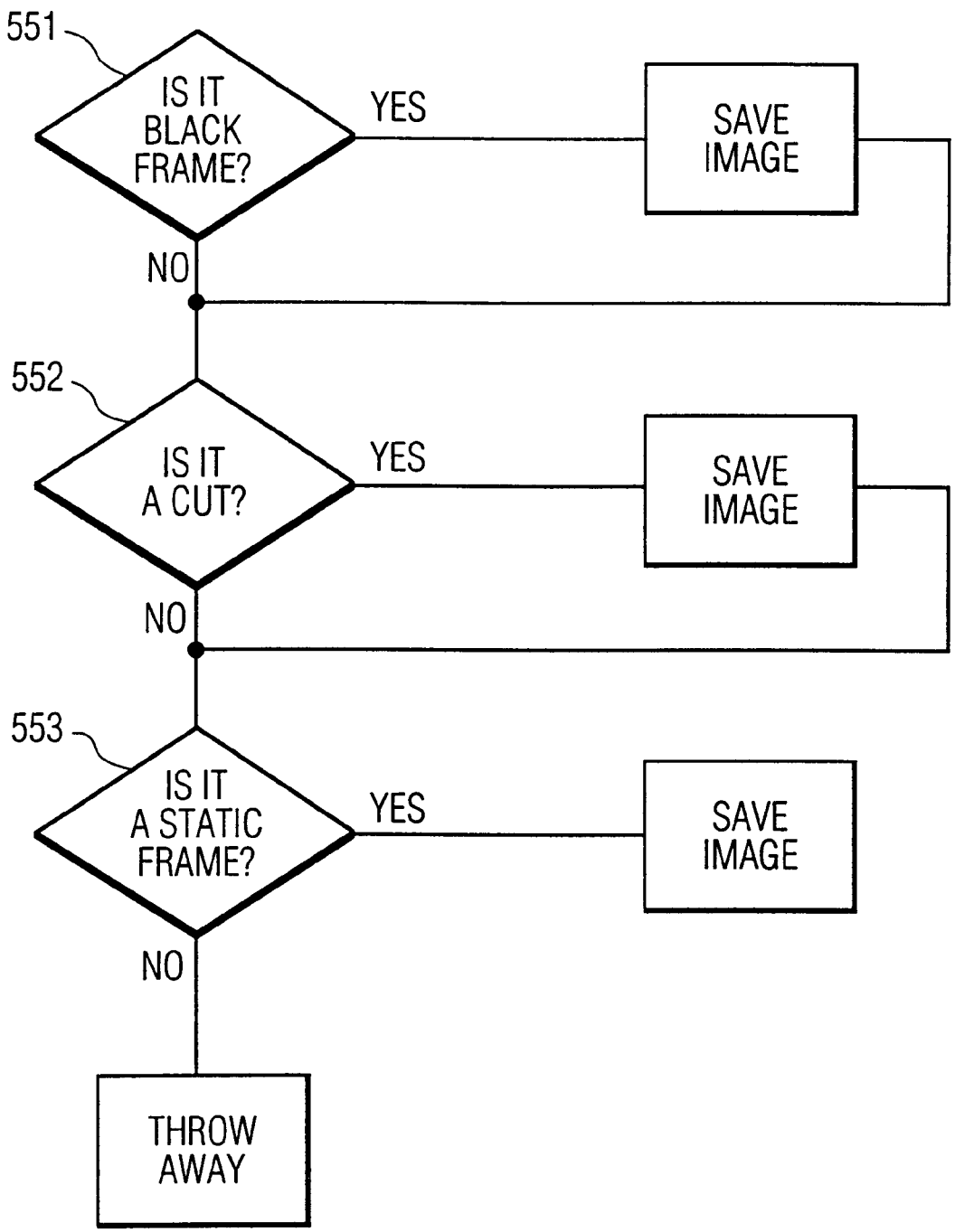
FIG. 5 is a flowchart for a cut detection thread.

Referring to FIG. 5, there is shown a flowchart describing the functions of cut detector thread 82. In step S51, cut detector thread 82 determines whether the frame is black frame or not. If it is, the image is saved in memory 78. If not, in step S52, cut detector thread 82 determines whether the frame is a cut. If it is, the image is saved. If not, at step S53, cut detector thread 82 determines whether the frame is a static frame. If it is, the image is saved. If the frame is not black, a cut, or a static frame, the frame is discarded.

Figure 6A:
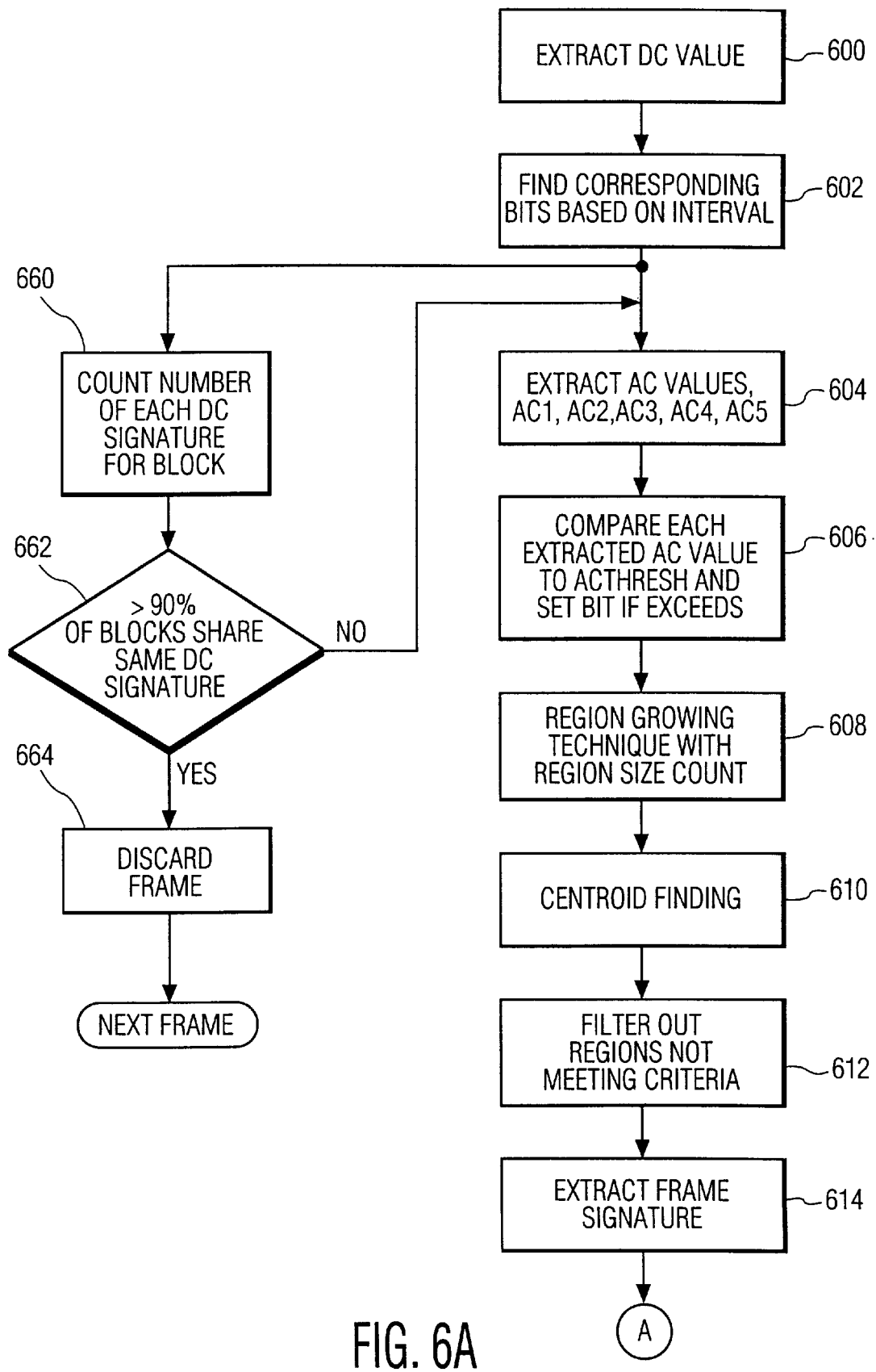
FIGS. 6A and 6B are a flowchart for a filter thread.
Figure 6B:
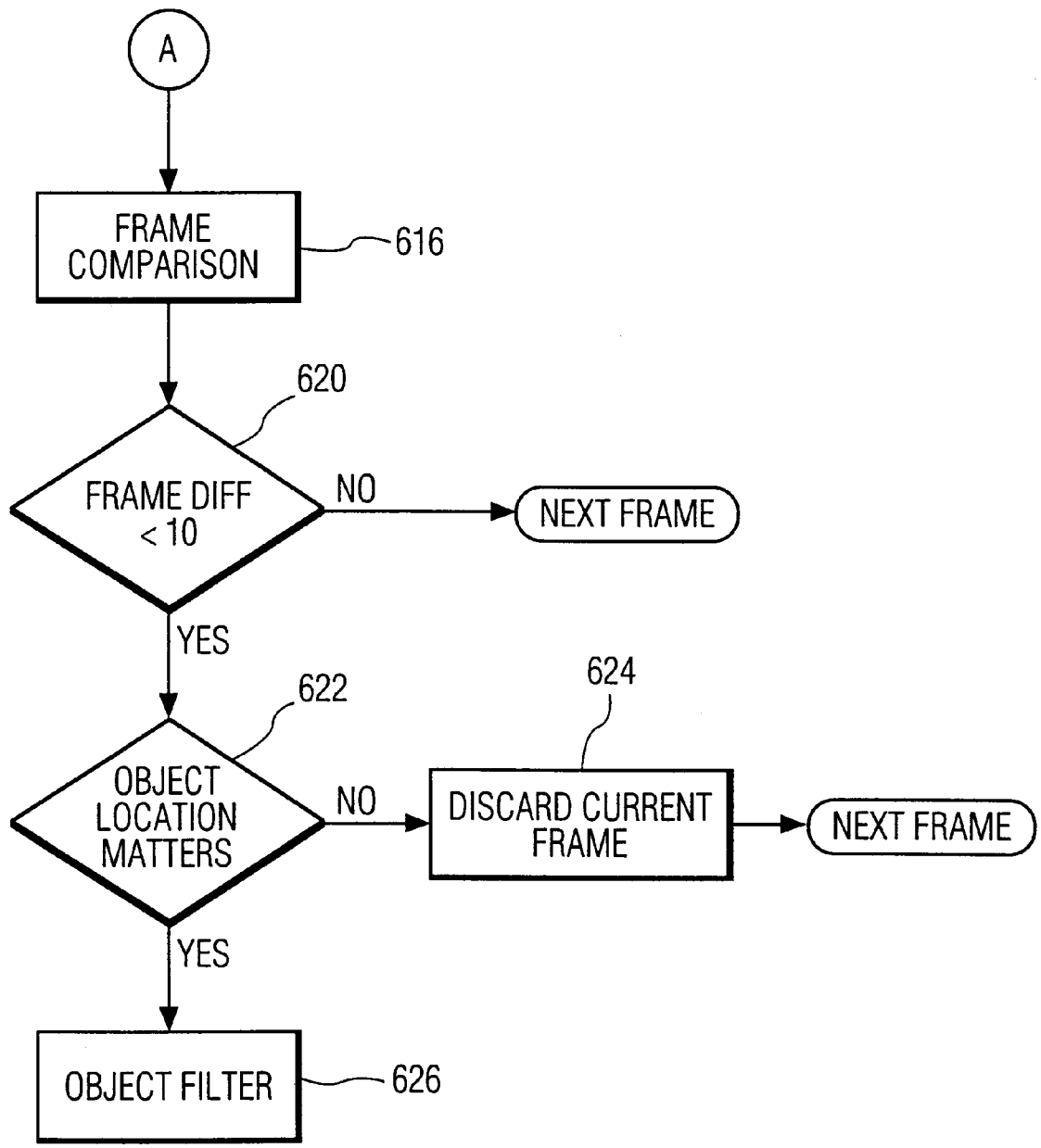
Figures 7, 8:
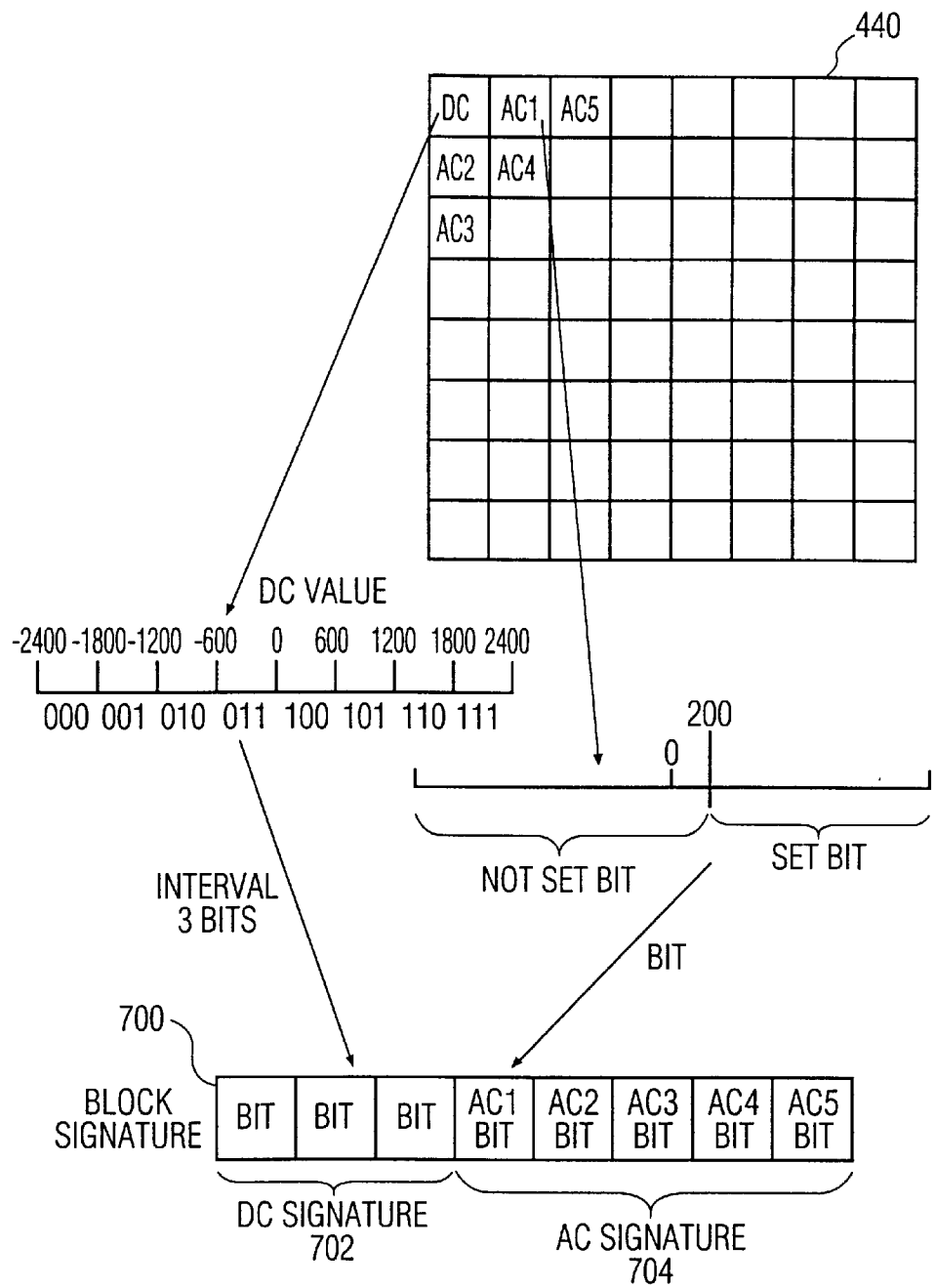
FIG. 7 is diagram of a signature method.
FIG. 8 is a table of a representative key frame list.

Keyframe Filtering—Any known method for determining a keyframe could be used to point out frames which are unicolor or which are similar to prior frames. This information will be used in the commercial detection methods explained below. For example, FIGS. 6A and 6B are flowcharts showing an overview of a procedure for keyframe filtering. As shown in steps 602 to 606 of FIG. 6A, a block signature is derived for each block in a frame. The block signature 700 is, in this example, eight bits, three of which represent a DC signature 702 and five of which represent an AC signature 704, as shown in FIG. 7. All other DCT coefficients in a block besides the DC value are AC values.

The DC signature is derived by extracting the DC value (step 602) and determining where the DC value falls within a specified range of values (step 604), in this example, between −2400 and 2400. The range is divided into a preselected number of intervals as shown in FIG. 7. In the present invention, eight intervals are used, although more or less intervals may be used for greater or lesser granularity of an image.

Each interval is assigned a predefined mapping such as that shown in FIG. 7. Each DC value is compared to the range and the mapping for the interval into which the DC value falls is returned. The value represented by the bits needed corresponds to the number of intervals. In this example, since the range is divided into eight intervals, three bits are used. As shown in FIG. 7, the block signature 700 will thus include the DC signature 702 as the first three bits and the AC signature 704 as the remaining five bits.

In step 604 of FIG. 6A, to give good representation of a range of AC values for the block, the five AC values closest to the DC values (A1–A5) are extracted, as shown in FIG. 7. In step 606, each of the five AC values is compared to a threshold (ACthresh), in this example, 200 and if the AC value is >ACthresh, a corresponding bit in the AC signature 706 is set to a predetermined value such as one, and if < or = to ACthresh, the corresponding bit is set to zero.

The block signature 700 is thus obtained and using the block signatures, specific images or frames may be filtered out such as frames which are unicolor.

A quick method to filter out unicolor frames occurs between steps 602 and 604, relying only on the DC signature. Each DC signature 704 is compared and a count is kept of each specific DC signature which occurs, (step 660) i.e., each DC signature represents into which interval the DC value falls, so in this example, eight different DC signatures exist). If, for example, 90% of the blocks or 1782 blocks (0.9 * 330 macroblocks * 6 blocks) fall in the same interval (have the same DC signature), the image is considered unicolor (step 662) and the frame is discarded or filtered out from frame memory (step 664). Alternatively, separate counts could be kept for each type of block (Cr, Cb . . . ) and each separate count compared to an associated threshold.

After deriving the block signatures (Blk_sig) for each block of each macroblock in the frame, regions are determined. Regions are, in this example, two or more blocks, each block of which neighbors at least one other block in the region and which shares a similar block signature to the other blocks in the region. Although each block signature of the frame could be compared to each other block signature and then counted to determine regions, the present invention may use a known technique such as a region growing process to determine regions within a frame (step 608). During the region growing process, a region counter is kept for each region to count the number of blocks in a region (size), and is represented by 16 bits. Once the entire frame has been analyzed to find the regions, another known method may be used to find a centroid or center of each region, which, in this example, is based on an x-y axis reference (step 610). Both the x and y coordinates are extracted as CX and CY, respectively, and are represented by 16 bits. Each region is then assigned a region signature, Region(Blk$_{13}$ sig$_r$, size$_r$, CX$_r$, CY$_r$) where r is a region number. The block signature for the region is determined based on a most dominant block signature as determined by the region growing process.

Based on specific criteria, in the present example, increasing size, the regions are sorted and region filtering may be performed (step 612). In this example, all but the largest three regions are filtered out. The remaining three regions are incorporated into a frame signature representing the frame. The frame signature, in the present example, is represented by 168 bits and of the form (Region1, Region2, Region3) or more specifically, (Blk_sig1, size1, CX1, CY1, Blk_sig2, size2, CX2, CY2, Blk_sig3, size3, CX3, CY3).

As shown in FIG. 6B, a flowchart of a frame comparison procedure compares a current (F2) and a previous (F1) frame based on their respective frame signatures (step 616). In the present example, the respective Region1s are compared, then the respective Region2s and lastly, the respective Region3s. Specifically, the block signatures of respective regions are compared according to the following:

$$FDiff=ABS(size1_{F1}-size1_{F2})+ABS(size2_{F1}-size2_{F2})+ABS(size3_{F1}-size3_{F2})$$

If FDiff is <10, the frames are considered similar and further object processing is performed (step 620). If FDiff is $\geq$10, the frames are considered different and neither frame is filtered under this procedure.

Regions generally represent an "object" which may be an object, person, thing, etc. Object processing determines if an object shown in a region in a previous frame is in a same location or in very close proximity. In the present example, the object is a primary focus of the frame or one of the more primary focuses. For example, a video may focus on a child playing with a ball, where the ball moves about within the frame. If a user wants to limit the number of frames in the visual index such that she does not care where the object is within an image (step 622), then at this juncture, F2, the current frame, is filtered out of frame memory (step 624).

If a user cares where an object is within a frame and wishes to filter only frames having an object shown in a same or very close proximity, several methods may be used (object filter, step 626).

A first method compares centers by determining their Euclidean distances, as shown below. Specifically, $$Edist=SQRT[(CX1_{F1}-CX1_{F2})^2+(CY1_{F1}-CY1_{F2})^2]+SQRT[(CX2_{F1}-CX2_{F2})^2+(CY2_{F1}-CY2_{F2})^2]+SQRT[(CX3_{F1}-CX3_{F2})^2+(CY3_{F1}-CY3_{F2})^2]$$

If Edist is >3, the object is assumed to have moved and no filtering is performed. If Edist is < or = to 3, the object is assumed to have remained in approximately the same position and thus, the current frame is filtered out.

A second method for object filtering compares frames using macroblocks. Specifically, block signatures of respective blocks within respective macroblocks are compared. For example, the block signature of the Y1 block of MB1,1 (macroblock in position 1,1 of a frame) of a current frame (F2) is compared to the block signature of the Y1 block of MB 1,1 of a previous frame (F1).

First, the DC signature of the Y1 blocks are compared. If the DC signatures match, the AC signatures are compared, bit by bit. A count (ACcount) is kept and if a preselected number of bits match, in the present example, four of five bits, a block counter (BlkCTR) is incremented. If the DC signatures do not match, or if the ACcount is <4, then the next block is analyzed.

Each block of the macroblock (in this example using 4:2:0, six blocks) is analyzed. When all the blocks in a macroblock are analyzed, the block counter is checked. If BlkCTR is $\geq$4, then the blocks are deemed similar and a macroblock counter (MBCTR) is increased.

Once all the macroblocks in an image have been analyzed, MBCTR is checked. If MBCTR is, in this example, > or = to 75% (247 or 0.75 * 330 macroblocks) of the macroblocks in a frame, the frames are deemed similar and the current frame (F2) is filtered out from the frame memory. If MBCTR is <75%, then no frames are filtered at this point.

An additional method for filtering out unicolor frames occurs when the region sizes are determined. If a region size is $\geq$90% of the frame blocks or 1782 blocks, the frame is deemed to be unicolor and is filtered from frame memory. This filtering requires more processing than the previous unicolor frame filtering method discussed.

Figure 10:
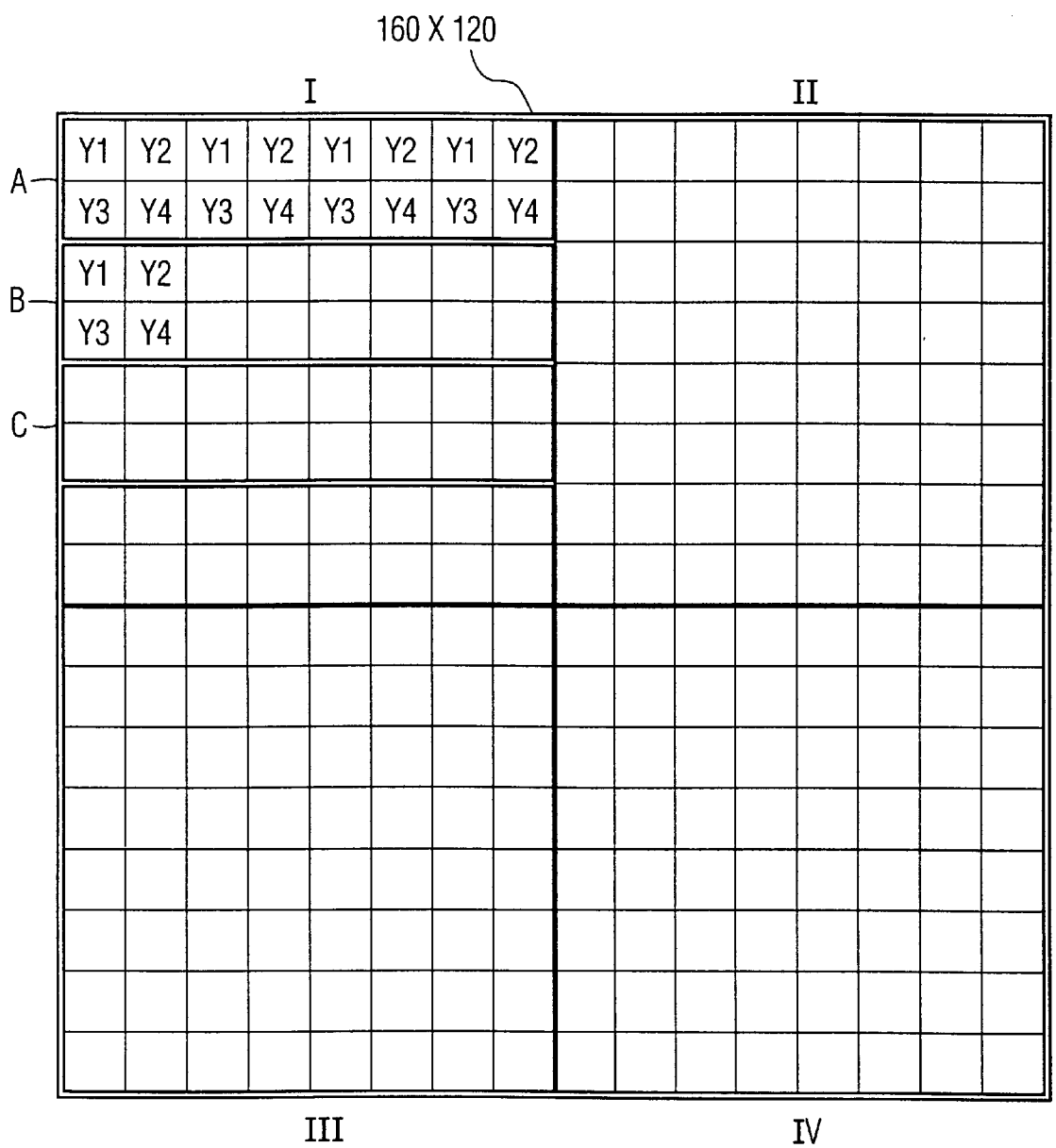
FIG. 10 is a diagram of a black frame detection method.

Black Frame Detection—The present invention optimizes prior art black frame detection techniques. Referring to FIGS. 3A–3D, if input 52 starts off as a YUV signal, the YUV input signal 52 is scaled down from 525×480 pixels in FIG. 3A to 160×120 in FIG. 3B. The luminance portion of the signal is then further segmented into 16×16 macroblocks as shown in FIG. 3D. Referring to FIG. 10, each of these macro blocks is then divided into four 8×8 blocks. At this point, the DCT operation is performed on each 8×8 block. This produces DCT coefficients in the same location as where the pixels were. In the present analyses, only the DC coefficient is needed for each 8×8 block. The process is symbolized in FIG. 4A. If input 52 starts off as a compressed signal, it must be decompressed but the DCT coefficients are retained as is shown in FIG. 4B. Clearly, the DCT procedure is performed for all of the frames, and not for just the frames undergoing black frame detection.

Referring also to FIG. 10, once the DCT has been performed, the 160×120 frame is divided into four quadrants. Each quadrant is defined by rows of DCT coefficients. The DC values in each row are averaged producing an average DC value "A". The first row is shown in FIG. 10. A maximum average value "max" and a minimum average value "min" is determined. In this case, only the first row has been analyzed. This necessarily means both min and max are equal to average DC value A (i.e. the average value of the DC coefficients of the first row). Then the second row in quadrant one is averaged to produce average value B. B is compared to A and new min and max values are calculated. This continues for the four rows in the quadrant. Min and max for the whole quadrant is then compared to each other. If the difference between them is less than 7.5% of max, the frame might be a black frame and so analysis continues for the other quadrants retaining the now calculated valves of min and max. If not, then the analysis ceases and the frame is deemed not black.

Analyzing row by row ensures that if any text is contained on the screen, it will be recognized. For instance, at the end of a movie, a credit sequence may show a single line or two of words. If one were to analyze the entire frame at once, the average luminance would be approximately equal to a gray frame and so may be incorrectly deemed a black frame. However, with the method of the present invention, that one line of text would produce a large max for its respective quadrant and so the frame would not be deemed black.

A third parameter is maintained for the entire system operation labeled "minmax". This is the lowest maximum value found in the quadrants. This parameter is used because an entire program may be brighter or darker depending upon its quality. If an absolute threshold were used, a black frame could be frequently detected in dark, poor quality programs or not at all in light programs. When an entire frame is analyzed and it looks like the frame may be black (i.e. min and max are within 7.5% of each other for all of the quadrants), the present invention then compares 75% of max to see if it is less than minmax. Therefore, the overall formula for detecting a black frame could be represented as:

max−min<(0.075)(max)AND(0.75)(max)<minmax→black frame

It should be made apparent that each frame does not have to be divided into quadrants and that the analyses does not have to be executed by rows. Analyses could be performed by any combination of blocks and rows. For example, detection could be done by row or half-row, by column, or by macro block. It could be performed for the whole frame as well. Analyzing the whole frame at once would be problematic because if there is any noise in the frame, it would not be deemed black. The more each block is divided, the less chance of any stray noise fouling up the black frame detection. Other methods of analysis include: looking at only an inner rectangle of the frame where the top, bottom, left, and right 10% of the frame is excluded; a checkerboard configuration where the frame is divided into a plurality of blocks defining columns and rows, analysis being performed on every other block; or some combination of the above methods. The shape chosen for dividing of the frame does not have to be a polygon either; any series of arbitrary shapes could be used.

This method of black frame detection has increased reliability because it divides and analyzes portions of each frame separately. This means even a small amount of text or image on the frame would not be read black by this method as it would in the prior art. Comparing the averaged values to an overall minimum maximum luminance value also avoids mis-detection due to bright or dark pictures. Dividing the frame into regions could decrease processing time because if the first regions is not black, the method stops and deems the whole frame not black.

Static Frame and Cut Detection—Any method known in the art could be used to detect a static frame or a cut. For example, one of the following methods/formulas could be used. As with black frame detection, macro-blocks of the frames are used.

Method One:

$$SUM[I]=\Sigma_{k,j}ABS(DCT1_{k,j}[I]-DCT2_{k,j}[I])$$

where:
k is the number of macroblocks in width of a frame, k=1 to Frame-width/16,
j is the number of macroblocks in height of a frame, j=1 to Frame-height/16,
I is the number of blocks in a macroblock, I=1 to number of blocks in macroblock,
$DCT1_{k,j}$ and $DCT2_{k,j}$ are DCT coefficients for the specified macroblock for a previous and a current video frame, respectively, as illustrated in FIG. 5 and
ABS is an absolute value function.

In this example, for a 352×240 pixel frame, k=1 to 22, j=1 to 15, and I=1 to 6. In this method and the following methods, the macroblock width of a frame or the macroblock height of a frame will be an even integer, since if the frame sizes are not evenly divisible, the frame size is scaled to fit during processing.

Method one differentiates between each of the blocks (four luminance and two chrominance blocks) of the macroblocks. In this method, DC values for each luminance and chrominance block in a current macroblock from the current video frame are respectively subtracted from a corresponding DC value for a corresponding block in the previous video frame. Separate sums of differences, SUM [I], are kept for each luminance and chrominance block in the macroblock.

The sums of differences are carried forward to the next macroblock and added to the corresponding differences (SUM[1], SUM[2], . . . SUM[6]). After processing each of the macroblocks of the current video frame, a summed difference is obtained for each luminance block and each chrominance block of the current video frame. Each of the six SUMS is compared to its own upper and lower threshold specific to the type of block for which the SUM has been totaled. This method allows different threshold comparisons for each type of block.

If SUM[i] is greater than a predetermined threshold (thresh1[i]), in this example, where:
thresh1[i]=0.3 * ABS($\Sigma_{k,j}DCT2_{k,j}[i]$), the current video frame is saved in a frame memory for further processing and possible use in the visual index. The frame memory may be a tape, a disk, as in the present invention, or any other storage medium, external or internal to the present system.

If SUM[i] is less than a predetermined threshold (thresh2 [i]), where:
thresh2[i]=0.02 * ABS ($\Sigma_{k,j} DCT2_{k,j}[i]$)
a static scene counter (SSctr) is increased to indicate a possible static scene. The previous video frame is saved in a temporary memory. In the present invention, the temporary memory only saves one frame, thus, the previous video frame will replace any video frame currently stored in temporary memory. When the counter reaches a predetermined number, (in this example, 30) the most previous video frame saved in the temporary memory is transferred to the frame memory for possible use in the visual index. Although, in the present invention, the first frame is saved to possibly represent a static scene, clearly one skilled in the art could save and use any one of the frames of a possible static scene in this method and the following methods.

If SUM[i] is between the two thresholds, SSctr is reset to zero and the next consecutive frames are compared.

Method Two:

$$SUM=\Sigma_{k,j}\Sigma\Gamma(DCT1_{k,j,i})-DCT2_{k,j,i})^2/ABS(DCT2_{k,j,i})$$

k is the number of macroblocks in width of a frame, k=1 to Frame-width/16,
j is the number of macroblocks in height of a frame, j=1 to Frame-height/16,
I is the number of blocks in a macroblock, I=1 to number of blocks in macroblock,
$DCT1_{k,j,i}$ and $DCT2_{k,j,i}$ are DCT coefficients for the specified macroblock and block for a previous and a current video frame, respectively, and
ABS is an absolute value function.

Method two, in contrast to method one, does not discriminate between block types. Instead, method two keeps a running total of DC differences between macroblocks of current and previous video frames.

Each difference between blocks is squared and then normalized to the DCT value of the current block. Specifically, the DCT value of a block from the current video frame is subtracted from the corresponding DCT of the corresponding block in the previous video frame. The difference is then squared and divided by the corresponding DCT value of the current video frame. If the current video frame DCT value is zero, the sum for that comparison is set to one. The differences for each of the DCT values of each block in each of the macroblocks of the frames are summed together to achieve a total sum, SUM.

The SUM is next compared to predetermined thresholds. If SUM is, in this example, greater than a predetermined threshold (thresh1), where:

thresh1=0.3 * ABS ($\Sigma_{k,j,i}$ $DCT2_{k,j,i}$), the current video frame is saved in the frame memory for further processing.

If SUM is less than, in this example, a predetermined threshold (thresh2), where:

thresh2=0.02 * ABS ($\Sigma_{k,j,i} DCT2_{k,j,i}$), a static scene counter (SSctr) is increased to indicate a possible static scene. As in method one, the previous video frame is saved in a temporary memory which only saves the most previous frame. When SSctr counter reaches a predetermined number (in this example, 30), the most previous video frame saved in the temporary memory is transferred to the frame memory.

If SUM is between the two thresholds, SSctr is reset to zero and the next consecutive frames are compared.

Method Three:

$$SUM[I]=\Sigma_{k,j}(DCT1_{k,j}[I]-DCT2_{k,j}[I])^2/ABS(DCT2_{k,j})$$

where:
- k is the number of macroblocks in width of a frame, k=1 to Frame-width/16,
- j is the number of macroblocks in height of a frame, j=1 to Frame-height/16,
- I is the number of blocks in a macroblock, I=1 to number of blocks in macroblock,
- $DCT1_{k,j}$ and $DCT2_{k,j}$ are DCT coefficients for the specified macroblock for a previous and a current video frame, respectively, and
- ABS is an absolute value function.

Method three like method one, differentiates between each of the blocks (four luminance and two chrominance blocks) of the macroblocks. In this method, DC values for each luminance and chrominance block in a current macroblock from the current video frame are respectively subtracted from the corresponding DC value for the corresponding block in the previous video frame. As in method two, however, each difference between blocks is squared and then normalized to the DCT value of the current block. Specifically, the DCT value of a block from the current video frame is subtracted from the corresponding DCT of the corresponding block in the previous video frame. The difference is then squared and divided by the corresponding DCT value of the current video frame. If the current video frame DCT value is zero, the sum for that comparison is set to one.

The differences for each of the DCT values of each type of block in each of the macroblocks are summed together to achieve a total sum for the type of block, SUM[i]. Separate sums of differences, SUM [I] are kept for each of the luminance and chrominance blocks in the macroblock. The sums of differences are carried forward to the next macroblock and added to the corresponding differences (SUM[1], SUM[2], . . . SUM[6]). After processing each of the macroblocks of the current video frame, a summed difference is obtained for each luminance block and each chrominance block of the current video frame. Each of the six SUMS is compared to its own upper and lower threshold specific to the type of block for which the SUM has been totaled. This method allows different threshold comparisons for each type of block.

If SUM[i] is greater than a predetermined threshold (thresh1[i] as previously defined), the current video frame is saved in the frame memory for further processing.

If SUM[i] is less than a predetermined threshold (thresh2[i] as previously defined), a static scene counter (SSctr) is increased to indicate a possible static scene. The previous video frame is saved in a temporary memory which, in the present invention, saves only the most previous video frame. When SSctr reaches a predetermined number, 30, the most previous video frame saved in the temporary memory is transferred to the frame memory.

If SUM[i] is between the two thresholds, the SSctr is reset to zero and the next consecutive frames are compared.

Method Four:

Methods one through three each work over the complete video frame, summing either the difference or square of the difference for the DCT values for all luminance and chrominance added together or summed as individual components. Method four works on the macroblock level providing an efficient result with limited processing.

$$SUM=\Sigma_{k,j}Mbdiff(MB1[i]_{k,j}-MB2[i]_{k,j})$$

where:
- k is the number of macroblocks in width of a frame, k=1 to Frame-width/16,
- j is the number of macroblocks in height of a frame, j=1 to Frame-height/16,
- I is the number of blocks in a macroblock, I=1 to number of blocks in macroblock,
- $MB1_{k,j}$ and $MB2_{k,j}$ macroblocks for a previous and a current video frame, respectively, and
- Mbdiff is a function that determines the number of blocks which are different from each other between two macroblocks, and outputs a first value if this difference is higher than a certain threshold and a second value otherwise.

Specifically, a subsum (subsum[1], subsum[2], . . . subsum[6]) is determined for each of the blocks (Y1, Y2, Y3, Y4, Cr and Cb) of a specific macroblock by comparing a respective block of a first macroblock to a corresponding respective block of a second macroblock to obtain a subsum [i] where:

$$subsum[i]_{j,k}=ABS\ (DCT1[i]_{j,k}-DCT2_{[i]j,k})$$

For example, the DC value of Cr of the first macroblock of the current frame is subtracted from the DC value of Cr of the first macroblock of the previous frame to obtain a subsum[Cr]$_{1,1}$. Each subsum[i] is compared to a predetermined threshold (th1). If the subsum[i] is, in this example, greater than a first predetermined threshold (th1), in this example, where:

th1=0.3 * subsum[i], a block counter (B1ctr) is incremented and if, lower than a second predetermined threshold (th2), where:

th2=0.02 * subsum[i], a block counter (B2ctr) is incremented. Each respective subsum[i] is compared to the thresholds (th1 and th2) which may be a constant(s), based on a fixed function(s) or based on a function(s) or constant(s) specific to the type of block.

After the six blocks of the macroblock have been processed, the block counters are analyzed. If the block counter B1ctr is, in this example, above a predetermined threshold (B1th), in this example, three, the macroblock is considered different from the corresponding macroblock of the previous video frame and a macroblock counter, MB1ctr, is incremented. The B1ctr is then reset and a next macroblock is analyzed.

When all the macroblocks of a video frame have been processed, MB1ctr is compared to predetermined frame thresholds. If MB1ctr is, in this example using a 320×240 frame (or image), above a first predetermined frame threshold (f1th) of 100, the current frame is saved in the frame memory and MB1ctr is reset.

If some number of blocks in a macroblock are similar, B2ctr is above a predetermined threshold (B2th) of three, the macroblocks are considered the same and a second macroblock counter, MB2ctr, is incremented. B2ctr is then reset and a next macroblock is analyzed. After all the macroblocks of a frame have been analyzed, if the second macroblock counter is above a second predetermined frame threshold (f2th) of 250, the video frames are considered the same and a frame counter (Fctr) is set. MB2ctr is reset and a next frame is analyzed. When Fctr reaches a predetermined threshold (SSthresh, in this example, 30), a static sequence is assumed to have occurred. The previous video frame is then saved in frame memory to represent the static sequence. This process continues until a video frame is determined to be different from the previous video frame or new frames are exhausted. Fctr is then reset and the next video frame is analyzed.

Those frames saved in frame memory in this and the preceding methods are considered keyframes.

Method four could also be implemented by using the normalized square of the differences. Specifically, instead of just using the difference between blocks, the difference would be squared and divided by the values found in the subtracted block. Scene cut detection may then be less sensitive to thresholds.

The thresholds set forth above may easily be altered to provide lesser or greater detection. For example, constants may be altered to allow for more or less efficiency, for example, SSctr could be different. Moreover, each threshold may instead be a constant, a fixed function, or a function variable on the type or location of the block being analyzed.

Threads—The system operates with increased efficiency if threads are used instead of sequential processes. Though only one thread is activated by processor 78 at any one time, all the threads share components between them. The threads also communicate with each other. For example, frame grab thread 80 sends frames to cut detector thread 82 and cut detector thread 82 sends DC values and detected cuts to filter thread 84.

Additionally, the threads all share the information stored in memory 78. Commercial detection thread 86 uses the information relating to cuts, black frames, static frames, and unicolor frames stored in memory 78 from cut detector thread 82 and filter thread 84. The threads have an order of priority as shown in FIG. 2 in circled numbers 1–4 next to the threads. Frame grab thread 80 has the highest priority because the other threads can not operate without a frame. Commercial detection thread 86 has the least priority because it needs the information from the other threads before it can make its calculations. The priority designation is also indicative of the frequency of use. Frame grab thread 80 and cut detector thread 82 both process information in real time—which is approximately 30 frames per second. Filter thread 84 and commercial detection thread 86 are used far less frequently (e.g. about 13 times less) than frame grab thread 80.

Frame grab thread 80 acquires frames from input 52 and sends them to cut detector thread 82. When a new frame is detected, processor 57 transfers control back to frame grab thread 80 and cut detector thread 82 waits. When frame grab thread 80 is done, either cut detector thread 82 or filter thread 84 becomes active. This means only one thread is "awake" at any one time. It is also possible that no thread at all is active. When input 52 stops, frame grab thread 80 turns off. Control continues with the other threads until processing is complete. If a sequential process were used and one step crashed or stopped processing, the entire system would be frozen. With a thread based system, control just branches to another thread. Also, one thread can write to a memory while another thread is processing thereby increasing the efficiency of the entire system.

Figures 18, 19:
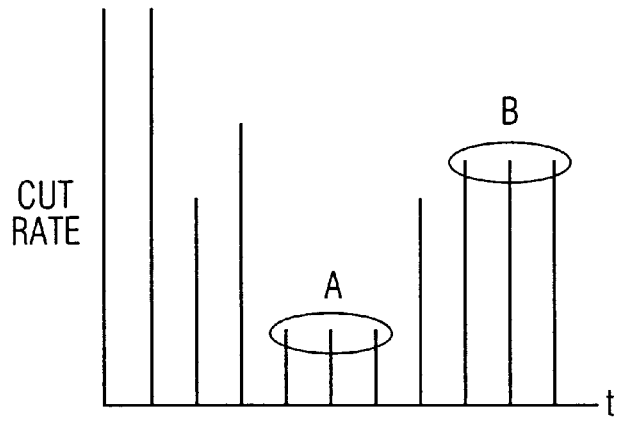
FIG. 18 is a graph of an average cut frame distance trend.
FIG. 19 is a table of a representative frame list buffer.

Memory—Cut detector thread 82 determines whether a frame acquired by frame grab thread 80 is a black frame, a cut, or a static frame. Referring to FIG. 19, this information is stored in a frame list buffer located in memory 78. A long, narrow list of frame numbers is generated along with any relevant characteristics. This list also contains a memory pointer indicating where in memory 78 the image relating to that block is being stored. This list can be used to keep all of the frames in a program. Alternatively, if the space being used for the frame list buffer is not needed anymore, it can be reallocated. This can occur, for example, after that frame has been processed and sent to the frame key list (described below) or when no significant event occurred in that frame.

Referring to FIG. 8, filter thread 84 uses the frame list buffer and composes a frame key list which lists only the frames which have "key" or important characteristics. This list contains the same information as the frame list buffer except that frames which were uneventful are excluded. It is these key frames which are processed by commercial detection thread 86. Commercial detection thread 86 determines where a commercial is located and outputs start and stop times of the commercial (or a tape location identification) to memory 78 in a commercial list (not shown). The frame key list can also be a window of key frames. For example, a user could indicate if she wishes to see only the last 1000 key frames.

Figure 9:
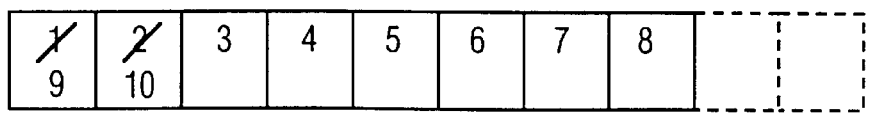
FIG. 9 is a diagram of a representative primary frame buffer.

Referring to FIG. 9, when frame grab thread 80 acquires a frame, that image is stored in memory 78 in an allocated primary frame buffer. The image waits there until it is processed by cut detector thread 82 and filter thread 84. Once the frame is processed by those threads, the frame is not needed anymore and a new frame is overwritten in the same memory space as the old frame. Eight blocks of memory are initially allocated to hold eight frames. By the time the eighth frame is acquired, the first frame is usually processed and so the ninth frame can be stored in the same memory space as the first frame was. If processing slows down for some reason, and the first frame has not been processed yet, additional memory will be allocated as seen in the phantom blocks. In an hour long broadcast, up to 50 blocks of memory could be required. When, for example, frame 1 is processed and the memory space is no longer needed for that frame, the pointers in the frame list buffer (FIG. 19) are altered. The pointer for frame 1 is deleted and new frame 9 now has a pointer directing toward the memory space where frame 1 had been (see also FIG. 9).

This can be viewed as a "rental shop" for memory. This shop initially allocates 8 spaces of memory. Once a space is not needed anymore, it rents that space to another frame. If more memory space is required, the rental shop will allocate it. Once memory space is allocated, the allocation is not discarded and new information is overwritten over any old information in the space. This is beneficial because the allocated block is always the same size and so it is not necessary to continually allocate different memory space. In other applications, it is not known beforehand how much memory is required and so such a rental shop is not possible.

In the present embodiment, two rental shops are used. The first rental shop keeps a copy of the frames in the YUV domain. This is done in case it will be desirable to show a full image to the user. For example, when a commercial is found, this image can be used to show the user the beginning of a commercial and prompt him as to whether he wishes to view or skip that commercial. A visual table could be created containing the content of detected commercials. The second rental shop holds the DCT coefficients. The YUV image is saved while DCT processing is performed. It can later be recalled if it is desirable to show the user the full image of a processed frame. Of course, the full set of YUV images is also sent to the storage medium (VCR tape). Clearly, one rental shop could be used to allocate space for both the DCT and YUV images. It is simpler to use two because the YUV image takes up more space than the DCT coefficients and so different sized memory allocations would be necessary.

II. Commercial Detection

Commercial detection thread 86 will not become active unless some triggering event occurs. This triggering event is the detection of one of the following: 1) a high cut rate. As defined more clearly below, a cut rate greater than 9 is indicative of a commercial OR 2) a sequence of at least 10–30 black frames. Generally, commnercial detection thread 86 remains dormant until one of these triggers occurs. However, commercial detection thread 86 could be programmed to perform its analyses periodically (e.g. every minute) or not until the end of the entire program.

All of the following techniques can be used to detect a commercial. The system will start with the average cut frame distance, average cut frame distance trend, cut rate, and black frame detection analyses (all of which are explained in detail below). These will produce a multiplicity of temporal segments where a commercial may be located. After that the following techniques, in order, can be used to further limit the possible commercial segments: 1) static or similar frames 2) logo detection 3) commercial signatures 4) text 5) brand names.

Each continuing set of techniques provides increased probability that a commercial is disposed within the time period. A user could be prompted as to how many stages or to what level of confidence she desires in discerning a commnercial. For example, a user may desire that only the periods that have the maximum probability of being a commercial be removed or the user could decide to conserve processing power. A confidence level could be assigned for each technique corresponding to its overall effectiveness in locating a commercial. Each of these confidence levels could be weighed as a function of the platform being used. For example, if a slow processor is present, some of the weights could be assigned a zero value indicating that they would cause the system to slow down so much that their effectiveness is not justified. If the confidence level of each technique is labeled $conf_i$ and the weight is $w_i$ then the complete confidence in the system is $$\text{confidence} = \sum_{i=1}^{n} w_i conf_i$$

Here, n=11 because there are 11 techniques being used. This confidence level could be chosen by a user. For example, a 70% confidence level could be chosen by a user.

Moreover, the weights could be a function of the category of the television program. For example, the commercial detection application could have input from the user or from an EPG (electronic programming guide) on the type of the program being analyzed. Some of the detection techniques may be better discriminators based upon the type of program and so the weight of those techniques could be adjusted accordingly. The weights wi could also be a function of a combination of variables.

i. Average cut frame distance (ACD)—If cuts are close to one another, this part of the detection process will indicate that a commercial has occurred. The formula used is:

$$ACD = \frac{cut_n - cut_{n-m}}{m}$$

where n is the current frame and m is the number of cuts to look back—typically 5. For example, if frame 1700 had a cut and the fifth cut after that (m=5) was frame 1750, we would get an ACD of 10. If ACD<150, the area between the measured cuts is probably within a commercial. The formula could easily be manipulated to be time dependent as well because of the inherent relationship between frame number and time.

ii. Cut rate detection.—Advertisers have a short amount of time to convey information. As a result, scenes are brief and changed frequently to get a consumer's attention. This means the cut rate, the amount of changes in scenes, is generally greater in a commercial than in a normal program. This technique is a calculation of the number of cuts that occur in a minute. If this number is greater than 9 and less than 40, then the analyzed frames are probably within a commercial. A cut rate of over 40 is probably indicative of a high action sequence in a movie and not a commercial.

iii. Average cut frame distance trend (ACDT)—The average cut frame distance (ACD), as the name suggests, determines the average distance between cuts. The ACDT is a determination of the changes in the ACD. As an analogy, if one thinks of the input as a function f(x), the cut rate would be the derivative of that function f'(x) and the ACDT would be the second derivative f''(x). Although this is not the instantaneous rate of change because the function is discrete, the idea is the same. The formula for ACDT is:

$$ACDT = \frac{ACD_n - ACD_{n-m}}{m}$$

where m is the number of frames in between cuts. As stated above, advertisers send many different images quickly to consumers in order to convey a message in a small amount of time. The ACDT takes into account the idea that the cut rate itself will remain constant in a commercial and not in a program. A commercial will either be very jumpy with images changing quickly and thus a high constant ACDT; or the images will not change much at all and thus a low constant cut rate. Referring to FIG. 18, there is a plot of the cut rate amplitude with respect to time. The cut rate at the points labeled "A" is approximately the same in amplitude. Similarly, the points in the area labeled "B" have the same cut rate amplitude. The ACDT for these areas would be approximately 0. Commercials generally have an ACDT of about 0 with a small standard deviation. Therefore, if the ACDT is approximately 0, as shown in areas "A" and "B", a portion of a commercial is deemed to have occurred in that area.

iv. Logos—Another technique used in this invention is the detection of an absence of a logo. Some prior art devices mentioned above have looked for the presence of a mark relating to an advertised product as evidence of a commercial. Some television programs have their own logos which are only present during the program. For instance, CNN and morning news shows generally have the network insignia in the lower right hand corner along with the time and perhaps the forecast weather conditions of the day. When this information is removed from the picture, that removal is indicative of a commercial being televised.

Figures 16, 17A, 17B, 17C:
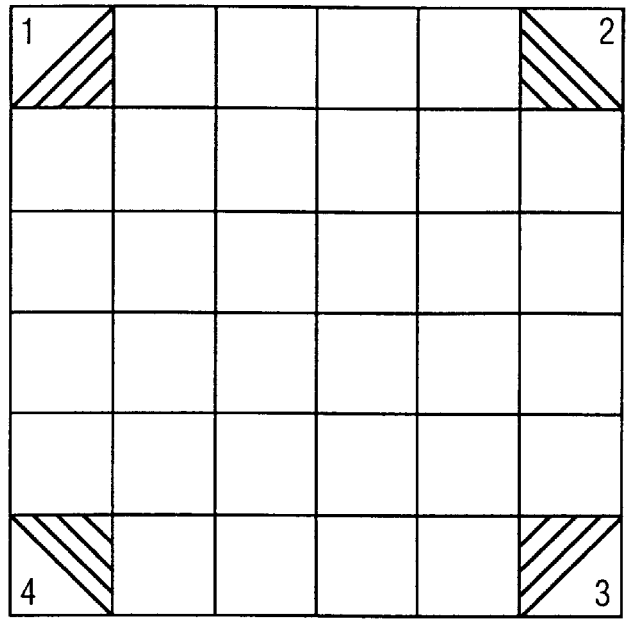
FIG. 16 is a diagram of the areas analyzed in logo detection.
FIGS. 17A, 17B and 17C show the logo detection method.

This logo is generally in a designated part of the screen—usually one of the four corners. Referring to FIG. 16, a frame is divided into a plurality of regions and only the four corners are searched. In those corners, the area most toward the corner does not have to be analyzed because there is a low probability that a logo will be displayed there due to limited visibility.

Referring to FIGS. 17A–17C, the luminance values in the corner area are compared through consecutive frames. The absolute frame difference is calculated for consecutive frames as is shown in FIG. 17C for frames in FIGS. 17A and 17B. These calculations are also made for cut detection. There is no logo if all of the pixels in the corner area are changing. If one region is all "0"s as shown in the absolute frame difference of FIG. 17C, then that area is probably a logo. This method assumed that the logo is static. Animated logos could be isolated using motion texture. If a portion of the logo changes (e.g. the time) then that part of the logo will not be detected. The area with all "0"s is retained thereby producing a logo image. A signature could then be created representing the logo. A bank of known logo signatures could be used as is described more completely in the next section. If a logo is found, when that logo disappears, a commercial is deemed to have begun.

Figure 12:
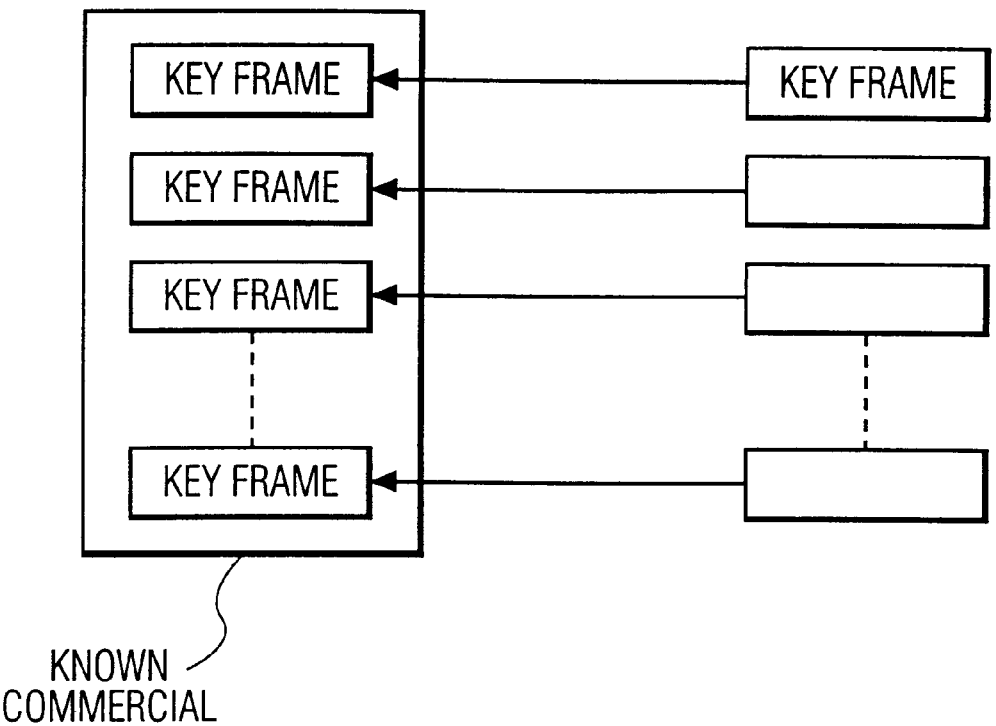
FIG. 12 is a diagram of a key frame list method.

There are other known methods for detecting shapes within a signal. For example, Hough transforms, b-spline analyses, NURBs, and wavelets could all be used to represent the signature and shape of a logo or to detect the logo itself Any other orthonormal or matching pursuit algorithm could also be utilized.

v. Signatures—In this method, the signatures of key frames of known commercials are extracted and stored in a database. The number of commercials stored is dependent upon the size of the database. A signature of a key frame requires about 1 k of memory if block signatures or 168 bytes of frame signatures are used. Each commercial has approximately 10 key frames. Referring to FIG. 12, key frames from the frame key list (shown more completely in FIG. 8) are sequentially compared to key frames of known commercials. If more than 50% of the key frames match, then the frames are deemed to be within a commercial.

A commercial found counter for each commercial in the database is incremented every time that commercial is detected. If a commercial is not seen within a predetermined period of time (e.g. a month) then the signatures corresponding to that commercial are removed from the database. If two known commercials sandwich a set of frames within a specified period of time (e.g. a minute) then those sandwiched frames are placed in a potential commercial database. These sandwiched frames could represent one or a plurality of commercials. If a subset of these frames matches known commercial frames at least two times, then these potential commercial frames are added to the database of known commercials. In this way, a dynamic database of known commercials is created.

Unlike prior art systems, this database allows users to actually browse through commercials. A user could determine, for example, who is having a sale or which car dealership is offering the best price on a desired vehicle. The database could be categorized to facilitate commercial searching. The database could keep the entire commercial or merely an index by key words created by known information retrieval methods.

Figure 11:
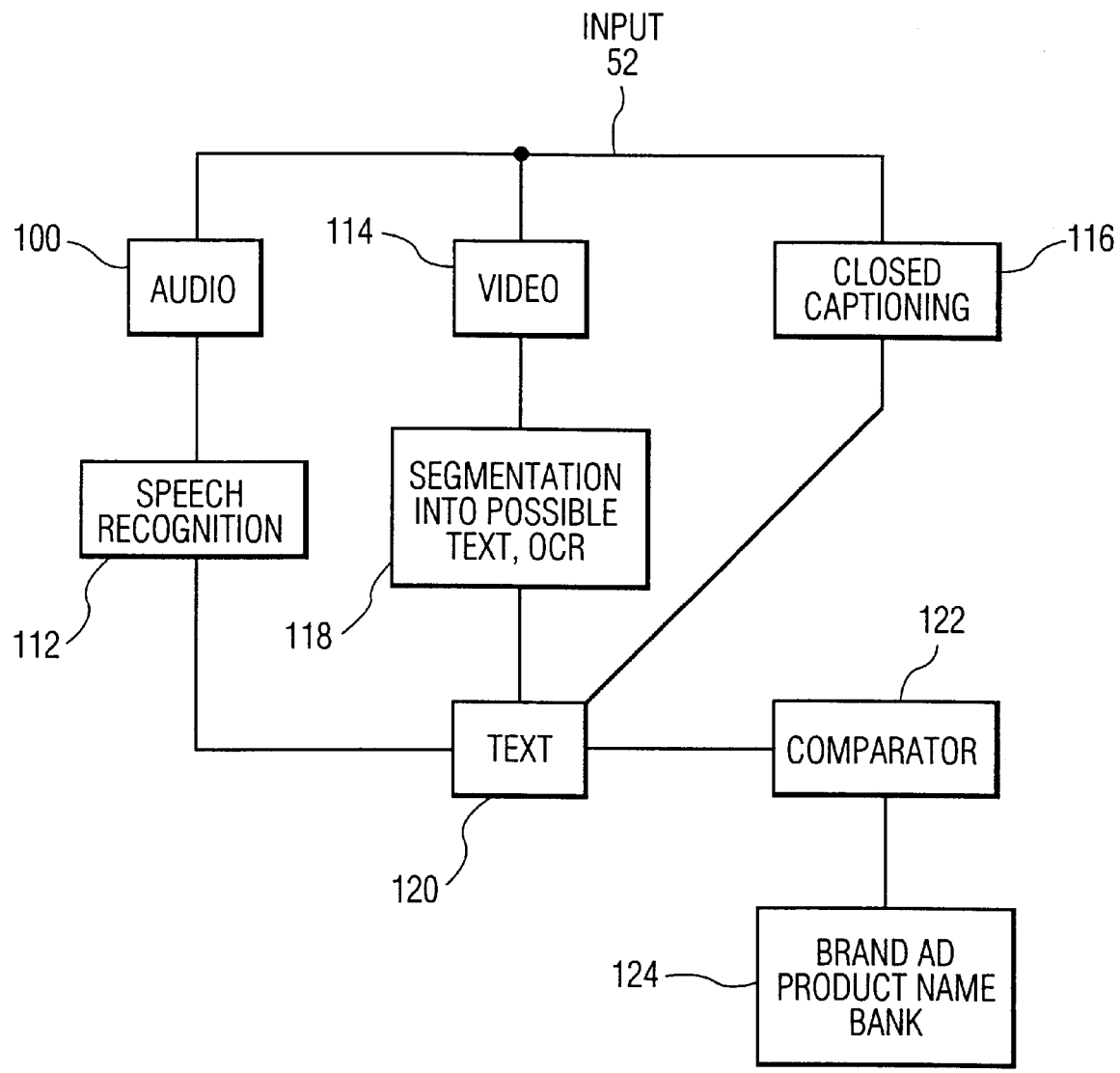
FIG. 11 is a block diagram of a brand name detection method.
Figure 13:
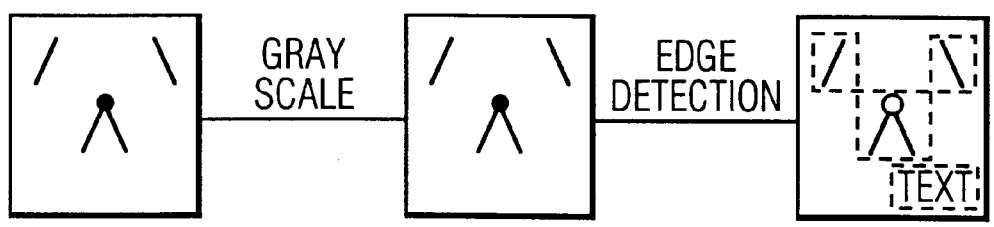
FIG. 13 is a block diagram of a text detection method.

There are many known methods for extracting a signature of a frame. For instance, a color histogram could be used. Alternatively, the signature method used in the filtration process could be implemented.

vi. Text and brand names—If a brand name is displayed, there is a very high probability that the frame is within a commercial. Referring to FIG. 11, input 52 is sent to an audio processor 100, a video processor 114, and a closed captioning processor 116. Audio processor 100 will send the signal through a speech recognition processor 112 which will convert the sound into text 120. Similarly, video processor 114 will send input 52 through a segmentation and OCR device 118 which will convert the video into text 120. Closed captioning processor 116 will also produce text 120. Text 120 is then compared to a brand and product name bank 124 with a comparator 122. All registered brand names can easily be determined and stored. If the (number of brand names in a specified time period)/(total number of words in that time period) is greater than a threshold—a commercial has occurred during that time period. The time period presently used is two minutes.

vii Black frame detection.—As stated above, commercials are usually preceded and followed by a black frame. The present apparatus will use the optimized black frame detection method related above to more accurately determine if a black frame has occurred. If it has, there is a high probability that a commercial precedes or follows it. Generally, many black frames are used to precede a commercial, but only one is needed to indicate where a possible start and end of a commercial occurs.

viii. Black frame and cuts—If a high cut rate is detected, this technique has the apparatus look back four minutes (7200 frames) for a sequence of black frames. The sequence must be at least 10–30 frames long. Generally, the time between commercials is greater than four minutes. If there is a high cut rate, and there was a sequence of black frames within the last four minutes, the high cut rate sequence is probably within a commercial.

ix. Frame similarity—As stated above, filter thread 84 determines whether a frame is similar to a frame received in the last 10 minutes. In a movie or a television program, the sequences are generally similar. This is done to give the audience the perception that a scene has not changed. For instance, in a sit-com, the same general layout is continually shown while the actors interact within that space. Commercials generally do not last longer than thirty seconds. As a consequence, in a commercial, the background changes dramatically every thirty seconds. Therefore, if a frame is found to be similar to another frame that occurred within the last thirty seconds, the present and last frames are presumed to be part of a commercial. If the time between similar frames is greater than thirty seconds, the frames are probably within a program.

x. Static images—Static images are like similar images except that a longer period of time is used for similar images. A commercial needs a lot of motion in order to quickly convey an idea to a viewer. Static images are thus usually located in programs and not commercials. Therefore, the present invention will look at the number of static images in a minute. Generally there are no static images in a commercial. If two or more statics are found, then the analyzed frames are probably not within a commercial.

xi. Character detection—When a commercial displays text, it is generally on different parts of the screen and in different fonts and sizes. This is distinguished from, for example, movie credits which have at least a similar pattern of font size and type. Referring to FIG. 13, a frame that has a potential commercial within it has two transformations applied to it. The frame is gray scaled and then edge detection is performed upon it.

After edge detection, the system will look to see what information is left in the frame. A maximum width and height of potential characters forms a threshold which is used to compare the resulting detected areas. If an area is too big or small to have text characters within it, it is removed from consideration. Once it is determined that there is a text character, similar characters are scanned for on the same vertical line. If more than three characters are found on the same line, the first character to the last character is deemed a word. For example, in FIG. 14, the system may not detect the letter "g" in the name "Eugene" because the "g" is too large. However, the other letters will be detected and then additional letters will be found on the same line. This will produce a word "Eu_ene". The system could then be programmed to perform additional analyses to find the "g".

All found words are represented by a box outlining their characters within the frame. The height of this box will vary depending on whether it is within a commercial or a program. Referring to FIGS. 15A–C, the center (x,y) and height (z) of this box are then plotted on a 3-dimensional axis. Sequential frames (or sequential key frames) are superimposed upon another with respect to time. If the text scrolls through the center of the screen, as in movie credits, the plot is a straight line as in FIG. 1SA. If the text just appears and disappears in the center of the screen, the plot will look like two close points as in FIG. 15B. In a commercial, the points will appear all over the graph as in FIG. 15C. This technique could be used only on key frames to save processing time, or every frame could be analyzed.

III. Playback

Once commercial detection has been performed, tape playback is relatively straightforward. As stated above, the times of detected commercials are saved in memory 78. During playback, processor 57 looks for these times and fast-forwards the tape during the detected commercial. A user could be shown the first frame of a commercial and be prompted as to whether he wishes to skip that commercial. Alternatively, processor 57 could be programmed to perform some form of content substitution. A user could request that another stimulus be provided instead of the commercial. For example, a user could request that the contents of a designated Web site be displayed.

If the user is watching the program while it is recording, a few minutes of the program would have to be buffered into a memory (e.g. memory 78), analyzed, and then output to a display. This is required to determine when and how long the commercial is. Such buffering can be performed, for example, by SMASH (Storage for Multimedia Application Systems in the Home) technology. If no buffering is performed, the initial portions of a commercial will be recorded and the initial portions of a program following a commercial will not be recorded. This is due to the fact that processing requires video information to detect a change between program and commercial.

If the user is not present, content substitution could be performed after the commercial detection processing. Processor 57 could then either substitute content for the commercials or remove them entirely—again if at least part of the program is buffered so that processor 57 could determine when the commercial begins and ends.

IV. Conclusion

The methods of this invention are based on DCT coefficients whose presence will increase along with the arrival of digital television and any other signals which use JPEG or MPEG compression algorithms. Although decompression must be performed on such a signal, this can be accomplished by many well known devices. Most of the processing power and time is spent finding the DCT coefficients and then restoring a full image. This invention thus recognizes the movement toward digital formatting.

Having described the preferred embodiment it should be noted that various changes could be made by those skilled in the art without detracting from the scope or spirit of the invention as is defined more clearly in the appended claims.

What is claimed is:

1. A home information appliance for detecting at least a portion of a commercial within a video data stream divided into a plurality of frames comprising:

at least one of an average cut frame distance detector, a cut frame distance trend detector, a brand name detector, a cut rate and black frame detector, a frame similarity detector, a character detector, and a static image detector, wherein said average cut frame distance detector performs the steps of a. calculating a quotient which includes a numerator representing the number of frames between a first frame with a cut and a previous frame with a cut and a denominator representing the number of cuts between said previous and first frames, b. comparing said quotient to a cut frame distance threshold, and c. identifying the occurrence of a portion of a commercial based upon said step of comparing;

said average cut frame distance trend detector determines a change in the number of cuts in a plurality of frames and detects a portion of a commercial based on said change;

said brand name detector performs the steps of a. processing said data stream through at least one of an audio processor, a video processor, and a closed captioning processor to produce text, b. comparing said text to a bank of product and trade names, and c. identifying a portion of a commercial based upon said step of comparing;

said cut rate and black frame detector identifies a portion of a commercial based on whether a series of black frames has occurred within a cut rate and black frame time period before an analyzed cut, said analyzed cut occurring within a sequence of cuts, said sequence occurring within a cut rate time period;

said frame similarity detector determines whether a present frame is similar to a previous frame and detects a portion of a commercial when a frame within a time period is similar to the present frame;

said character detector performs the steps of
- a. finding letters within an analyzed frame of said frames,
- b. creating a box around said letters,
- c. determining dimensions of said box,
- d. determining a location of said box within said analyzed frame,
- e. analyzing said dimensions and said location of said analyzed frame with subsequent analyzed frames, and
- f. detecting a portion of a commercial based upon said step of analyzing; and said static image detector detects a portion of a commercial when a number of static frames has occurred within a time period.

2. The home information appliance as claimed in claim 1 further comprising:

a frame grabber for acquiring said frames;

a first detector for identifying within said data stream at least one of cuts, similar frames located within a first period of time, and black frames;

a second detector for identifying within said data stream at least one of frames which are similar within a second period of time and frames which are substantially the same color; and a third detector thread for identifying said commercials using information produced by said first and second detectors.

3. The home information appliance as claimed in claim 2 wherein said second period of time is greater than said first period of time.

4. The home information appliance as claimed in claim 1 wherein at least one of the following is predetermined: said number of cuts in said average cut frame distance detector, said cut rate and black frame time period, said series, said sequence, said cut rate time period, said time period in said frame similarity detector, and said time period and said number of static frames in said static image detector.

5. The home information appliance as claimed in claim 1 wherein each of said detectors uses DCT coefficients of said data stream.

6. The home information appliance as in claim 1 further comprising a storage device for storing said data stream and for substituting alternate content in place of a detected commercial.

7. The home information appliance as claimed in claim 1 further comprising a means for skipping a detected commercial.

8. A method for identifying commercials within a video data stream divided into a plurality of frames through detection of at least one of average cut frame distance, average cut frame distance trend, brand name, black frame, cut and black frame, frame similarity, character detection, and static image, wherein:

average cut frame distance detection includes:
- a. calculating a quotient which includes a numerator representing the number of frames between a first frame with a cut and a previous frame with a cut and a denominator representing the number of cuts between said previous and first frames,
- b. comparing said quotient to a cut frame distance threshold, and
- c. identifying the occurrence of a portion of a commercial based upon said step of comparing;

average cut frame distance trend detection is a determination of a change in the number of cuts in a plurality of frames, detection of a portion of a commercial being based on said change;

brand name detection includes the steps of
- a. processing said data stream through at least one of an audio processor, a video processor, and a closed captioning processor to produce text,
- b. comparing said text to a bank of product and trade names, and
- c. identifying a portion of a commercial based upon said step of comparing;

black frame detection includes the steps of
- a. dividing an analyzed frame of said frames into a plurality of regions;
- b. calculating an average maximum luminance value for said regions;
- c. calculating an average minimum luminance value for said regions;
- d. comparing said average maximum luminance value and said average minimum luminance value with a black frame threshold, and
- e. identifying the occurrence of beginning or an ending of a commercial based on said step of comparing;

cut and black frame detection identifies a portion of a commercial based on whether a series of black frames has occurred within a cut and black frame time period before an analyzed cut, said analyzed cut occurring within a sequence of cuts, said sequence occurring within a cut rate time period;

frame similarity detection is a determination of whether a present frame is similar to a previous frame, a portion of a commercial being when a frame within a time period is similar to the present frame;

character detection includes the steps of
- a. finding letters within an analyzed frame of said frames,
- b. creating a box around said letters,
- c. determining dimensions of said box,
- d. determining a location of said box within said analyzed frame,
- e. analyzing said dimensions and said location of said analyzed frame with subsequent analyzed frames, and
- f. detecting a portion of a commercial based upon said step of analyzing; and static image detection identifies a portion of a commercial when a number of static frames has occurred within a time period.

9. The method as in claim 8 where in said black frame detection:

said step of dividing includes the step of dividing said analyzed frame into four quadrants; and said step of comparing includes comparing said average minimum and average maximum luminance values for one quadrant at a time.

10. The method as in claim 8 where said black frame detection further comprises the steps of:

determining the smallest average maximum luminance value; and comparing said maximum luminance value with said smallest average maximum luminance value.

11. The method as in claim 8 where said detectors use DCT coefficients of said data stream.

12. The method as in claim 8 further comprising a storage device for storing said data stream and for substituting alternate content in place of said commercial.

13. The method as claimed in claim 8 further comprising a means for skipping a detected commercial.

14. The method as claimed in claim 8 further comprising:
   a frame grabber for acquiring said frames;
   a first detector for identifying within said data stream at least one of cuts, similar frames located within a first period of time, and black frames;
   a second detector for identifying within said data stream at least one of frames which are similar within a second period of time and frames which are substantially the same color; and
   a third detector thread for identifying said commercials using information produced by said first and second detectors.

15. The method as claimed in claim 14 wherein said second period of time is greater than said first period of time.

16. The method as claimed in claim 8 wherein at least one of the following is predetermined: said number of cuts in said average cut frame distance detector, said cut rate and black frame time period, said series, said sequence, said cut rate time period, said time period in said frame similarity detector, and said time period and said number of static frames in said static image detector.

17. The method as in claim 8 where in said black frame detection said steps of comparing are performed on every other one of said regions.

18. The method as in claim 8 where in said black frame detection said step of dividing comprises excluding outermost portions of said analyzed frame.

19. The method as in claim 8 where in said black frame detection said steps of calculating, comparing, and identifying are performed on one of said regions at a time.

\* \* \* \* \*